April 19, 1966  G. A. SCHMIDT  3,247,358
DUAL HEAT LEVEL SOLDERING IRON
Filed Sept. 4, 1962
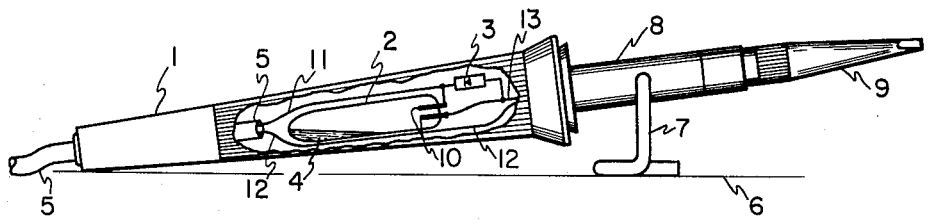
FIGURE 1
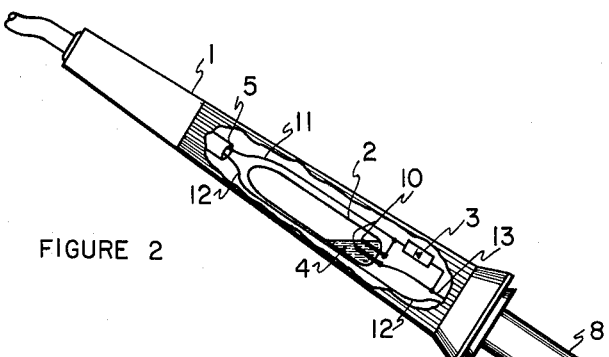
FIGURE 2
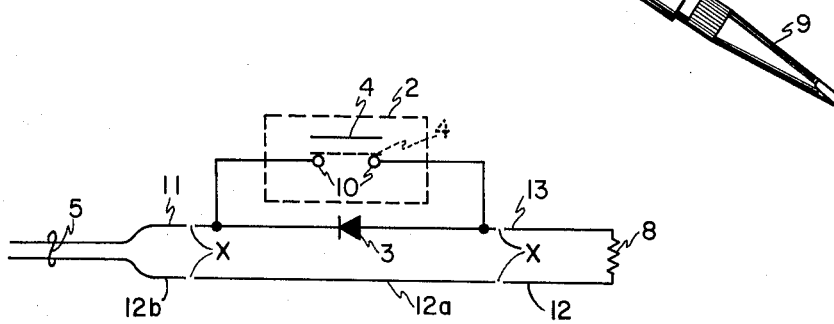
FIGURE 3
FIGURE 4
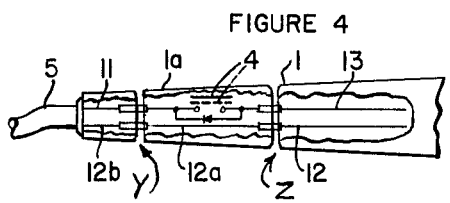
GLENN A. SCHMIDT
INVENTOR.
BY Norman L. Chalfin
AGENT

United States Patent Office 3,247,358
Patented Apr. 19, 1966

3,247,358
DUAL HEAT LEVEL SOLDERING IRON
Glenn A. Schmidt, Los Angeles, Calif., assignor of thirty percent to Norman L. Chalfin, Pasadena, Calif.
Filed Sept. 4, 1962, Ser. No. 221,268
6 Claims. (Cl. 219—240)

This invention relates to soldering irons in general and more particularly to a means whereby more efficient and long-lasting use can be achieved from such irons or other electric hand tools.

It is an object of this invention to provide a means whereby soldering irons can be used more efficiently with less loss due to tip wear than is experienced in prior art soldering irons.

It is another object of the invention to provide a switching device in electric hand tools which is operative in alternate use and rest positions thereof to apply a lower power level to the iron during rest positions thereof than during a use position thereof thereby increasing the life of the soldering iron tip.

It is a further object of the invention to provide in an electric soldering iron, a heating control means wherein a lower power level is applied to the iron heating element during a rest position than during a use position thereof.

It is still another object of the invention to provide a diode in series with one leg of the power leads to an electric soldering iron and a gravity actuated switch thereacross said switch being responsive to the use and rest positions of the iron handle to become shorted or open so as to cut the diode in and out of the circuit.

These and other objects of the invention will become more clear from the specification which follows in which one preferred embodiment is set forth but which is not limited to the one embodiment since one skilled in the art could after learning the details herein set forth apply the invention in many ways within the ambit of the claims. In the accompanying drawing:

FIGURE 1 is an illustrative example of a typical electric soldering iron shown in a rest position thereof with part of the handle thereof cutaway to show an embodiment of the invention therein;

FIGURE 2 is an illustration of the same iron shown in FIGURE 1, wherein the iron is in a work position;

FIGURE 3 is a schematic circuit diagram of the connections of the embodiment shown in FIGURES 1 and 2; and FIGURE 4 is a schematic representation of a plug-in embodiment of the invention.

In the normal use of electric hand tools of which the hand held soldering iron is an example, the user generally lays the tool down on his work bench when it is not in use. A rest for a soldering iron usually places the tip higher than the handle in the rest position. In a soldering iron the power is constantly applied to the heating element when in use and during the time of general use even when not soldering. When on a soldering iron rest and not in fuctioning use thereof the tip being higher than the handle increases the flow of heat to the tip leading to more rapid deterioration of the iron tip. The tip disintegrates more rapidly as a result.

In FIGURE 1, to which reference is now being made, an embodiment of this invention is shown when the iron in which it is installed is on an iron rest. In FIGURE 1 the iron shown includes a handle 1, a heating element 8, and a tip 9 attached to heating element 8. A power connection cord 5 enters handle 1 and normally would be connected directly across heating element 8 at its terminal wires 12 and 13.

In the present invention as shown in the cutaway portion of the handle 1 the normal lead 13 is broken to form leads 11 and 13. Between leads 11 and 13 a gravity actuated switch 2 is connected. Switch 2 may be a mercury switch. A semiconductor diode 3 is connected in parallel with switch 2 across leads 11 and 13.

As shown in FIGURE 1 the iron is positioned on a table top represented at 6 with the heating element 8 or tip 9 resting on a supporting rest 7 so that tip 9 is higher than handle 1.

The switch shown in FIGURE 2 (at 2) is a typical glass sealed mercury pool switch within which contacts 10 may be closed when mercury pool 4 engages them. The switch 2, as shown in FIGURE 1, is in the open position thereof, wherein contacts 10 are separated, forming an open circuit across diode 3. As may be seen in FIGURE 1 the liquid mercury pool 4 is below the contacts 10 and therefore they are open. Due to gravity the mercury falls to the lowest point in its glass container. At rest therefore as shown in FIGURE 1, only diode 3 is in series with the leg of the power line 5 formed by leads 11 and 13. The complete circuit includes diode 3 and heating element 8 in series across line connections 11–12.

Thus, diode 3 permits only one half cycle of the alternating current source connected externally to line 5 to be applied to heating element 8 reducing the power to it and consequently reducing the heat generated therein. Tip 9 in contact with element 8 therefore runs cooler during non-use on the iron.

When the iron is lifted for use as shown in FIGURE 2, the mercury pool 4 falls across contacts 10 shorting them and thereby also shorting diode 3 to apply full cycle A.-C. power to heating element 8. Tip 9 is thereby immediately raised to its full heat. When iron tip 9 is raised again by placing it on rest 7 contacts 10 open and tip 9 cools somewhat due to the reduction in power afforded by the half wave current applied. The tip is thus not disintegrated as rapidly as would be the case in the absence of switch 2 and diode 3.

The schematic circuit of FIGURE 3 illustrates the alternate circuit conditions of FIGURES 1 and 2. The condition prevailing for the resting iron as shown in FIGURE 1 is indicated by the position of switch bar 4 the schematic representation of mercury pool 4 (solid line) during non use of the iron. The dashed line shows the position of pool 4 when the iron is in use and the mercury pool 4 makes contact with contacts 10 shorting out diode 3. In the former condition (open circuit of contacts 10) heating element 8 is in series with diode 3. In the latter condition (contacts 10 shorted) heating element 8 is across power line leads 11–12 directly.

In FIGURE 4 there is shown the elements of FIGURE 3 schematically inserted in an iron such as shown in FIGURE 2 wherein the power cord end of the iron 5 can be made separable from the body 1 thereof. If the circuit shown in FIGURE 3 is broken at the points marked "X" in the figure the portion between 11 and 13 thereof can be mounted separately in a plug-in device 1a. Within separable part 1a, are the mercury switch 2 and the diode 3 connected in the same manner as shown in FIGURE 3.

The principle hereinabove described may be applied to other manual electric tools. An electric drill or an electric eraser are examples of such hand tools which could be so wired as to be operative upon being lifted from the work bench or drafting table and inoperative when laid down. A mercury or gravity actuated switch may be employed as hereinabove described in a plug-in form which can be made for use as an attachment to existing hand tools or for tools which are provided with separable power cords. A device according to this invention could be provided with a male and female plug arrangement at either end for such use as hereinabove described.

What is claimed is:

1. A manual electric tool comprising:
   a handle portion;
   an electrically operated work portion carried and supported by said handle portion;
   wiring means having a pair of leads for connecting said tool to an alternating current source of electric power, and being connected with said electrically operated work portion to carry said electric power to said work portion;
   a gravity actuated switch means disposed in said handle portion and connected in series with one of said pair of leads of said wiring means, said switch means having a closed position when said handle portion is held in an operative position by a user of said tool so as to be at a higher level than said work portion and an open position when said handle is at a lower level than said work portion as when said work portion is inoperative on a rest raised above a work surface and said handle portion rests upon said work surface; and
   a diode connected in parallel with said gravity actuated switch means, said diode forming a conductive path for only one half cycle of said alternating current when said handle is in said inoperative position thereof and said diode being short-circuited by said gravity actuated switch means when said handle portion is held in said operative position by said user whereby both half cycles of said alternating current are applied to said work portion, so that,
   during said short circuited operation of said diode full electric power is thereby applied to said work portion and during said inoperative position of said tool while said diode is in series with one lead of said pair of leads, and the open condition of said gravity actuated switch prevails, only one-half cycle of said electric power is applied to said work portion, protecting said work portion from excessive energy drain when not in use.

2. A manually used electric tool including:
   a handle portion;
   an electrically operated work portion carried and supported by said handle portion;
   electrical connection means connected between said work portion and an external source of alternating current electric power;
   a gravity actuated switch located within said handle portion and connected to said electrical connection means; and
   a power reduction diode also located within said handle portion, said diode being connected across said gravity actuated switch whereby when said handle portion is raised above said work portion in the normal operative position of the tool said switch is closed, said diode being short-circuited thereby permitting both half-cycles of said alternating current electric power to be applied to said work portion and when said tool is inoperative at rest upon a surface where said handle portion is lower than said work portion, as when said work portion is on a rest raised above a work surface and said handle is on said work surface, said gravity actuated switch is open and said power reduction diode is conductive on only one half cycle of said alternating current electric power reducing thereby the power applied to said work portion during said inoperative condition of said tool.

3. A soldering iron having a use position and a resting position, said iron comprising:
   a handle portion;
   a tip;
   a heating element carried by said handle portion and in thermal contact with said tip for heating said tip;
   a power line having two leads for connecting said heating element to an external source of alternating current electric power;
   a mercury switch disposed within said handle portion and connected in series with one of said leads between said source and said heating element, said mercury switch being positioned in said handle so as to be closed when said handle portion is lifted in said use position of said soldering iron to be higher than said tip, and said mercury switch being open when said handle portion is laid on a work surface in the resting position of said iron;
   and a diode connected in parallel with said mercury switch, whereby when said soldering iron is held in its normal use position said mercury switch is closed short-circuiting said diode to apply full power to said heating element therein and when said soldering iron is laid upon a workbench in the resting position thereof, said mercury switch is open so that said diode is in series with said one lead of said power line to reduce the power applied to said heating element by virtue of the fact that only one half cycle of the alternating current is conducted to the heating element by said diode, and whereby the resulting reduced heating of said iron during non-use thereof slows down the disintegration and wear of said tip.

4. The combination defined in claim 1 wherein said gravity actuated switch means and said diode are contained in a plug-in device made a removable part of said handle portion of said manual electric tool.

5. The combination defined in claim 2 wherein said gravity actuated switch and said diode are inserted operatively in a plug-in element made a removable part of said handle portion of said electric tool.

6. The combination defined in claim 3 wherein said mercury switch and said diode form a plug-in element made a removable part of said handle portion of said soldering iron.

References Cited by the Examiner

UNITED STATES PATENTS

| | | | |
|---|---|---|---|
| 723,634 | 3/1903 | Ayer | 219—231 |
| 908,238 | 12/1908 | Ganser | 200—157 X |
| 1,430,830 | 10/1922 | Morgan | 219—257 X |
| 2,494,840 | 1/1950 | Stephenson | 219—231 |
| 2,512,089 | 6/1950 | Cervin | 200—157 X |
| 2,543,103 | 2/1951 | Friesen | 219—242 |
| 2,575,318 | 11/1951 | Mattern | 200—152 |
| 2,619,576 | 11/1952 | Greibach | 219—240 |
| 2,705,276 | 3/1955 | Wise | 219—488 |
| 2,737,570 | 3/1956 | Aita | 219—240 X |
| 2,896,125 | 7/1959 | Morton | 321—8 X |
| 3,009,071 | 11/1961 | Morton | 315—272 X |
| 3,028,525 | 4/1962 | Morton | 315—272 |

FOREIGN PATENTS 462,004  2/1951  Italy.

ANTHONY BARTIS, *Acting Primary Examiner.*
RICHARD M. WOOD, *Examiner.*